(12) United States Patent
Breddermann et al.

(10) Patent No.: US 12,554,011 B2
(45) Date of Patent: Feb. 17, 2026

(54) METHOD FOR OPERATING A RADAR SYSTEM FOR A VEHICLE

(71) Applicant: HELLA GmbH & Co. KGaA, Lippstadt (DE)

(72) Inventors: Tobias Breddermann, Lippstadt (DE); Tai Fei, Hamm (DE); Frank Gruenhaupt, Marsberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 539 days.

(21) Appl. No.: 17/940,719

(22) Filed: Sep. 8, 2022

(65) Prior Publication Data

US 2023/0003878 A1 Jan. 5, 2023

Related U.S. Application Data

(63) Continuation of application No. PCT/EP2021/055100, filed on Mar. 2, 2021.

(30) Foreign Application Priority Data

Mar. 9, 2020 (DE) .................... 10 2020 106 276.1

(51) Int. Cl.
| | | |
|---|---|---|
| *G01S 13/93* | (2020.01) | |
| *G01S 7/28* | (2006.01) | |
| *G01S 7/282* | (2006.01) | |
| *G01S 7/285* | (2006.01) | |
| *G01S 13/931* | (2020.01) | |
| *H01Q 1/32* | (2006.01) | |

(52) U.S. Cl.
CPC ............ *G01S 13/931* (2013.01); *G01S 7/282* (2013.01); *G01S 7/285* (2013.01); *H01Q 1/3233* (2013.01)

(58) Field of Classification Search
CPC ........ G01S 13/931; G01S 7/282; G01S 7/285; H01Q 1/3233
See application file for complete search history.

(56) References Cited

U.S. PATENT DOCUMENTS

| | | |
|---|---|---|
| 9,354,304 B2 | 5/2016 | Kirsch et al. |
| 10,401,486 B2 | 9/2019 | Schoor |

(Continued)

FOREIGN PATENT DOCUMENTS

| | | |
|---|---|---|
| DE | 102014212390 A1 | 12/2015 |
| EP | 2755045 A1 | 7/2014 |

(Continued)

OTHER PUBLICATIONS

International Search Report dated Jun. 11, 2021 in corresponding application PCT/EP2021/055100.

*Primary Examiner* — Robert W Hodge
*Assistant Examiner* — Helena H Seraydaryan
(74) *Attorney, Agent, or Firm* — Muncy, Geissler, Olds & Lowe, P.C.

(57) ABSTRACT

A method for operating a radar system for a vehicle in order to detect at least one target object in the surroundings of the vehicle, wherein the following steps are carried out: providing a first, a second, and at least one third transmit signal, transmitting the provided transmit signals, wherein the transmit signals are transmitted successively via a transmit antenna of the radar system, in each case with partial signals transmitted at time intervals, and the intervals of the partial signals differ for different transmit signals.

14 Claims, 3 Drawing Sheets

(56) References Cited

U.S. PATENT DOCUMENTS

2014/0253365 A1* 9/2014 Kirsch .................. G01S 13/58
  342/112
2019/0391247 A1* 12/2019 Gulati .................. G01S 13/341
2021/0003695 A1 1/2021 Akamine et al.

FOREIGN PATENT DOCUMENTS

| EP | 3056920 A1 | 8/2016 |
| JP | 2019168449 A | 10/2019 |
| WO | WO2016096198 A1 | 6/2016 |

* cited by examiner

METHOD FOR OPERATING A RADAR SYSTEM FOR A VEHICLE

This nonprovisional application is a continuation of International Application No. PCT/EP2021/055100, which was filed on Mar. 2, 2021, and which claims priority to German Patent Application No. 10 2020 106 276.1, which was filed in Germany on Mar. 9, 2020, and which are both herein incorporated by reference.

BACKGROUND OF THE INVENTION

Field of the Invention

The present invention relates to a method for operating a radar system for a vehicle. Further, the invention relates to a radar system for the vehicle.

Description of the Background Art

It is known from the conventional art that radar systems are used in vehicles, among others, in order to monitor a vehicle's surroundings. Such radar systems can have at least one radar sensor on the vehicle, each with at least one transmit and receive antenna. The radar sensors enable detection of target objects in the vehicle's surroundings. Extensive signal processing can be performed to determine the parameters of the detected target objects, such as, e.g., a distance, a relative speed, or a direction of the target object with respect to the vehicle. Nevertheless, the computing power of the hardware used for signal processing is often limited, so that the computational complexity of the signal processing must be reduced. In addition, due to the increasing use of radar systems in road traffic, mutual disturbances of radar sensors of different vehicles can occur more frequently. These disturbances, such as interference, can significantly impair the functionality of the radar systems.

SUMMARY OF THE INVENTION

It is therefore an object of the present invention to overcome at least partially the above-described disadvantages. In particular, it is an object of the present invention to propose an improved option for operating a radar system in which interference-induced disturbances can preferably be reduced.

In this regard, features and details that are described in relation to the method of the invention naturally also apply in relation to the radar system of the invention and conversely in each case, so that with regard to the disclosure, reference is or can always be made mutually to the individual aspects of the invention.

The object is achieved in particular by a method for operating a radar system for a vehicle in order to detect at least one target object in the surroundings of the vehicle. The vehicle can be designed, for example, as a passenger vehicle or a truck. Said vehicle can have a driver assistance system into which the radar system is functionally integrated.

It can be provided that the following steps are carried out in the method of the invention: providing a first transmit signal, a second transmit signal, and at least one third transmit signal and possibly further transmit signals, and transmitting the provided transmit signals, therefore, the first, second, third, and possibly further transmit signals.

During the transmission, the transmit signals can be transmitted successively via (at least or exactly) one transmit antenna of the radar system. Alternatively, or in addition, the transmit signals can each be transmitted with partial signals transmitted at time intervals. These intervals of the partial signals can differ for different transmit signals. In other words, the partial signals of the first transmit signal can have different intervals to one another than the partial signals of the second and third transmit signals and vice versa in each case. Thus, it can be provided that the transmit signals differ from one another with regard to the intervals of the partial signals. In contrast, the partial signals of only one of the transmit signals (e.g., the first transmit signal) can have a fixed interval, therefore, always the same interval. Each interval of different transmit signals can occur only once in this case; therefore, each interval can be different from one another.

According to the invention, the advantage can be achieved that disturbances in the radar system, specifically interfering signals caused by interference of radar signals from different radar systems, can be reduced more reliably. Interference can occur when two radar systems transmit at the same time in the same frequency range (in spatial proximity to one another). The interfering signal occurs as a peak (peak value) in the time domain when the radar system acquires information and leads to an emphasis of the spectrum in the frequency domain. Because the interfering signal has the same slope as the useful signal of the radar system, the disturbance can occur as a sinusoidal oscillation within the time domain. The frequency of this oscillation leads to a peak in the spectrum, which hardly differs from real targets. Detection of this interference is then very problematic in both the time and frequency domains. Therefore, the invention is based on the idea that superposition of the radar signals (therefore, transmit and receive signals) from different radar systems with a completely identical modulation should be avoided. Therefore, the diversity between the radar signals used by the radar system can be increased. Advantageously, it can be provided in this case that the number of partial signals (especially chirps) and/or the maximum duration of the partial signal sequence and/or the occupied bandwidth are not changed. Specifically, transmit signals with different partial signal intervals (chirp-chirp intervals) can be used for this purpose, so that the different partial signal intervals are output alternately.

It can thus be provided that the number of variations of the partial signal intervals is increased. This makes it possible to reduce the probability of occurrence of a superposition of partial signals or chirps with an exactly identical modulation.

It is also optionally conceivable that the partial signals can each be implemented as frequency-modulated ramps, in particular as chirps. Thus, each partial signal can have a modulated frequency. This can be used in the signal processing of the radar system to determine a distance (of the radar system or vehicle) to the target object. In addition, the sequential transmission of the partial signals makes it possible to determine a relative speed (of the radar system or vehicle) to the target object for each of the transmit signals.

It can be provided within the scope of the invention that after the transmission of the transmit signals, the following step is performed, in particular by a processing device: receiving receive signals specific to the transmit signals reflected on the target object and delayed by a propagation time in order to detect the at least one target object based on the receive signals.

Optionally, it can be provided that after receiving the receive signals (within the signal processing of the radar system), the processing of the receive signals occurs in each case to carry out the detection of the target object. Furthermore, it is optionally provided that at least one frequency analysis of the respective receive signal is carried out in order to determine a distance and/or a relative speed and/or a direction of the target object.

To detect the at least one target object, the radar system can first transmit the transmit signals $s1(t)$, $s2(t)$, $s3(t)$, $s4(t)$, etc., briefly summarized as s(t), via at least or exactly one transmit antenna. The single transmit signal s(t) can comprise each of the partial signals, e.g., multiple sequentially output ramps (also referred to as chirps).

It can be provided as a further advantage that the partial signals are each frequency modulated. The chirps can thus each be frequency modulated and accordingly have a varying frequency. For example, a linear frequency modulation is used hereby in which the frequency changes linearly within a given bandwidth in the case of a particular chirp. The transmit signals s(t) reflected on at least one target object and delayed by a signal propagation time can then be detected as receive signals e(t) by at least one receive antenna of the radar system. The baseband signal b(t) is obtained, with the frequency $f_b = f_s - f_e$, from the combination of the respective transmit signals s(t) and the respective associated receive signal e(t). Here $f_s$ is the frequency of the corresponding transmit signal s(t) and $f_e$ is the frequency of the corresponding receive signal e(t). The frequency $f_b$ depends on the signal propagation time $\tau$ and thus on the distance R of the target object.

To perform the detection of the at least one target object, detection information can be determined based on the respective receive signal e(t) and in particular based on the baseband signal b(t). For example, the detection information results from the digitized baseband signal b(t) or from a frequency analysis of the baseband signal b(t). Accordingly, the detection information can be digital information, therefore, data values. If N chirps are output for one of the transmit signals, then the time period of a respective chirp is T1/N. After the time period T1, the respective receive signal, therefore, also of the detection information, can be processed within the time period T2-T1. The entire measurement cycle for one of the transmit signals thus has a time period T2, so that the transmission of the next transmit signal s(t) can take place after the time period T2. T2 can be fixed for all transmit signals s(t), or the time periods T1 and/or T2 can also vary. The different transmit signals $s1(t)$, $s2(t)$, $s3(t)$, etc., may differ in terms of the intervals between the chirps.

During the time period T1, the individual values of the respective receive signal e(t) can be acquired, so that the detection information is formed from the acquired values and, if necessary, a preprocessing (such as a down-conversion and/or an analog-to-digital conversion and/or a Fourier transformation). The acquired values can be interpreted as a matrix in which until the end of the time period T1 the values are stored sequentially in time in a M×N matrix with M samples per chirp and N chirps in a two-dimensional manner. The detection information can correspond to this two-dimensional configuration. A first dimension can be specific to a distance to the target object, and the other (second) dimension can be specific to the Doppler frequency and thus to the relative speed to the target object. Using this matrix, at least one spectrum can then be determined by at least one Fourier transformation of the matrix, a spectrum from which the relative speed and/or the distance of the at least one target object in the vehicle's surroundings can be determined. Specifically, a spectrum, which is again put together as a two-dimensional matrix and from which the distance can be determined, can be determined from a (e.g., column-wise) first Fourier transformation of the matrix in the direction of the first dimension (column-wise). The relative speed can then also be determined from a (row-wise) second Fourier transformation in the direction of the second dimension of the spectrum. If multiple receive antennas are used, a third dimension can also be used for the receive signals e(t) of the different receive antennas. A third Fourier transformation in the direction of this third dimension can be used to determine an incidence angle and thus the direction of the target.

Further, it can be provided within the scope of the invention that the intervals of the partial signals are (in particular always) the same for the same transmit signals (therefore, with the same indices, e.g., the repeatedly transmitted $s1(t)$) and/or the intervals of the partial signals are (in particular always) different for different transmission signals (therefore, with different indices, e.g., $s1(t)$ and $s2(t)$). It is possible to avoid interfering signals more reliably in this way.

Preferably, within the scope of the invention, it can be provided that providing the transmit signals additionally comprises providing at least one fourth transmit signal or further transmit signals. The variations of different partial signal intervals can be further increased thereby.

In addition, it is conceivable within the scope of the invention that the transmit signals are transmitted repeatedly and/or alternately, so that an immediate (successive) repetition of the same transmit signals with partial signals with the same interval is avoided. The diversity between radar signals can be increased thereby.

It can optionally be possible for the differences in the intervals of the partial signals to be defined in such a way that interference by external radar systems is reduced. This can be achieved, e.g., by an empirical setting of the intervals.

Further, it is conceivable that the intervals of the partial signals are in the range from 0.001 ms to 1 ms. Thus, a range can be selected so as to increase diversity without significantly impairing the performance of the radar.

Advantageously, it can be provided within the scope of the invention that a sequence of transmitting the transmit signals is predefined. For example, the providing can take place in such a way that the sequence of the transmit signals and, if necessary, also a predefined sequence of the partial signals are prestored in a non-volatile manner.

A further advantage can be achieved within the scope of the invention if at least four or at least five different transmit signals are transmitted with different partial signal intervals. This enables a further reduction in the probability of occurrence of interference with external radar systems.

The subject of the invention also is a radar system for a vehicle for detecting at least one target object in a vehicle's surrounding, said radar system having an (in particular electronic) processing device for providing a first, a second, and at least a third transmit signal and for transmitting these provided transmit signals via (at least) one transmit antenna of the radar system. In this case, it is provided that the processing device is designed to transmit the transmit signals (in particular alternately) successively, in each case with partial signals transmitted at time intervals, so that the transmit signals differ from one another with regard to the intervals of the partial signals. In other words, the intervals of the partial signals can differ for different transmit signals. Thus, the radar system of the invention provides the same advantages as have been described in detail with reference to a method of the invention. In addition, the radar system, specifically the processing device, can be suitable for executing the steps of a method of the invention. The processing device is implemented, for example, as an electronic circuit arrangement, preferably with at least one microcontroller and/or processor. Accordingly, a computer program can also be provided comprising instructions which, when the computer program is executed by the processing device, cause it to perform the steps of a method of the invention. The radar system is designed, for example, as a continuous wave radar, in particular as a frequency-modulated continuous-wave radar (FMCW radar).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
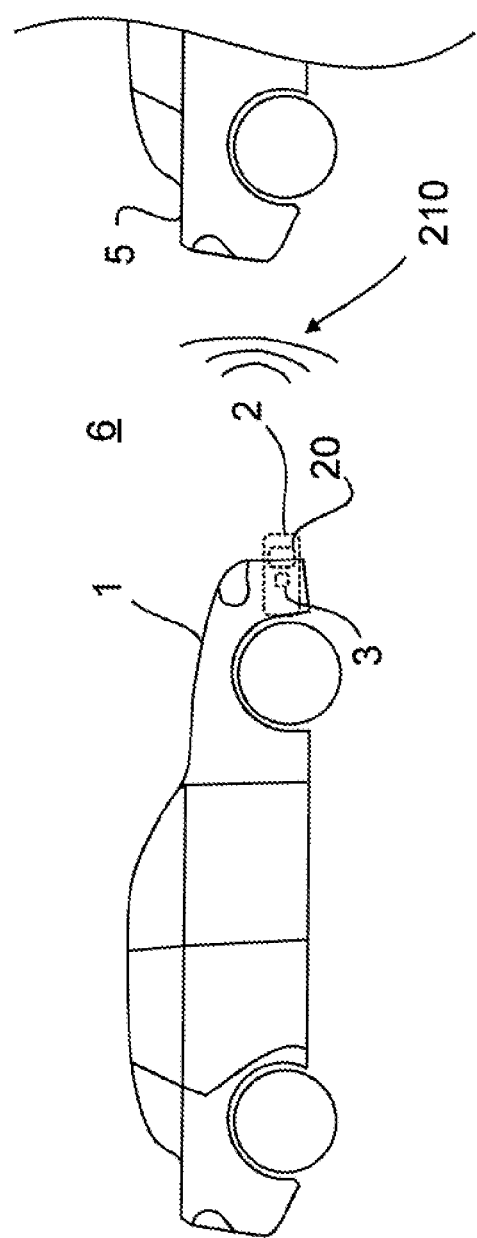
FIG. 1 is a schematic representation of a vehicle with a radar system of the invention in a side view.

FIG. 1 shows a radar system 2 of the invention for a vehicle 1 for detecting at least one target object 5 in the surroundings 6 of vehicle 1. It can be seen that a processing device 3 of radar system 2 is provided for providing 101 a first, a second, and at least a third transmit signal 210. This is taken to mean that processing device 3 predefines the manner in which transmit signals 210 are output. Processing device 3 can also serve to enable transmitting 102 the provided transmit signals 210 via a transmit antenna 20. For this purpose, processing device 3 can be electrically connected to transmit antenna 20 to electrically output transmit signals 210 there. Processing device 3 can further be configured to transmit signals 210 sequentially each with partial signals 211 transmitted at time intervals, such that the intervals d of partial signals 211 differ for different transmit signals 210. Thus, processing device 3 enables the implementation of a method of the invention.

Figure 2:
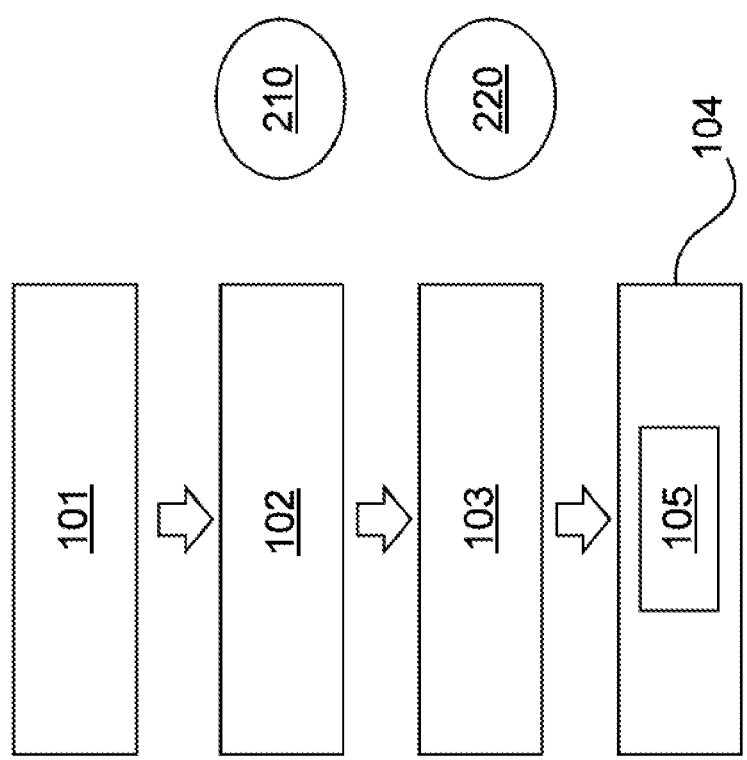
FIG. 2 is a schematic visualization of a method of the invention.

FIG. 2 shows the method of the invention with further details. Providing 101 the first, the second, and the at least one third transmit signal 210 can occur first, and then transmitting 102 the provided transmit signals 210 via transmit antenna 20. Furthermore, after transmitting 102 transmit signals 210, a receiving 103 of receive signals 220 can occur, wherein receive signals 220 are specific to transmit signals 210 reflected on target object 5 and delayed by a propagation time. After receiving 103 receive signals 220, processing 104 of receive signals 220 can be carried out in each case to enable detection of target object 5. In this case, at least one frequency analysis 105 of respective receive signal 220 can be carried out to determine a distance and/or a relative speed and/or a direction of target object 5.

Figure 3:
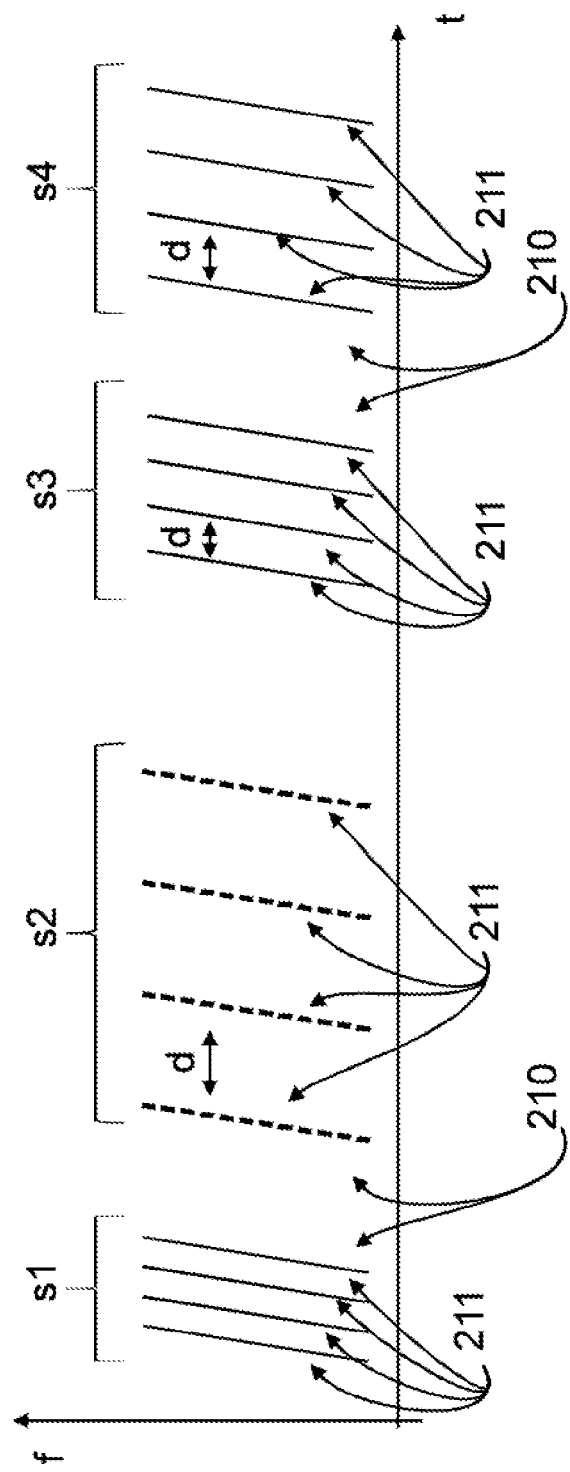
FIG. 3 is a schematic visualization of the transmission of transmit signals in a method of the invention.

FIG. 3 shows by way of example a frequency response f of transmitted transmit signals 210 over time t. Specifically, in this case, a first transmit signal s1, a second transmit signal s2, a third transmit signal s3, and a fourth transmit signal s4 are transmitted sequentially when transmitting 102. This sequence can be repeated during the operation of radar system 2. Each of transmit signals 210 has partial signals 211 in the form of chirps. It can be seen that transmit signals 210 differed from one another in terms of the intervals d of partial signals 211. By way of example, partial signals 211 are each formed as frequency-modulated ramps, in particular chirps. As shown in FIG. 3, the intervals d of partial signals 211 can always be the same for the same transmit signals 210 and the intervals d of partial signals 211 can always be different for different transmit signals 210. Transmit signals 210 are transmitted repeatedly and alternately, so that an immediate repetition of the same transmit signals 210 with partial signals 211 of the same interval d is avoided. The transmission of s4 can thus again be followed by the transmission of s1 to s4.

The above explanation of the embodiments describes the present invention solely in the context of examples. Of course, individual features of the embodiments can be freely combined with one another, if technically feasible, without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a radar system for a vehicle in order to detect at least one target object in the surroundings of the vehicle, the method comprising:
   providing transmit signals that include a first, a second, and at least one third transmit signal; and
   transmitting the first, the second and the at least one third transmit signals successively via a transmit antenna of the radar system, each of the first, the second and the at least one third transmit signals being transmitted with partial signals that are transmitted at time intervals, each of the partial signals being frequency modulated ramps having a same frequency and slope,
   wherein the first, second and at least one third transmit signals differ from one another with regard to the time intervals of the partial signals, and
   wherein the differences of the time intervals of the partial signals are defined such that interference by external radar systems is reduced.

2. The method according to claim 1, wherein each of the partial signals are implemented as frequency-modulated ramps.

3. The method according to claim 1, wherein the time intervals of the partial signals are the same for the same transmit signals and the time intervals of the partial signals are different for different transmit signals.

4. The method according to claim 1, wherein the providing of the transmit signals additionally comprises providing at least one fourth transmit signal.

5. The method according to claim 1, wherein the transmit signals are transmitted repeatedly and alternately, so that an immediate repetition of the same transmit signals with partial signals with the same time intervals is avoided.

6. The method according to claim 1, wherein the time intervals of the partial signals are in the range from 0.001 ms to 1 ms.

7. The method according to claim 1, wherein a sequence of transmitting the transmit signals is predefined.

8. The method according to claim 1, wherein each of the partial signals are frequency modulated.

9. The method according to claim 1, wherein at least four or at least five different transmit signals are transmitted, each with different time intervals of the partial signals.

10. The method according to claim 1, wherein after the transmission of the transmit signals, the following step is carried out: receiving receive signals specific to the transmit signals that were reflected by the at least one target object and delayed by a propagation time in order to detect the at least one target object based on the receive signals.

11. The method according to claim 10, wherein after receiving the receive signals, processing of each of the receive signals occurs to carry out the detection of the at least one target object.

12. The method according to claim 10, wherein at least one frequency analysis of each of the receive signals is carried out in order to determine a distance and/or a relative speed and/or a direction of the at least one target object.

13. A radar system for a vehicle for detecting at least one target object in the surroundings of the vehicle, the radar system comprising:
- a processor to provide transmit signals that include a first, a second, and at least one third transmit signal, and to transmit the transmit signals via a transmit antenna, wherein the processing device is further configured to successively transmit the transmit signals, with each of the transmit signals being transmitted with partial signals that are transmitted at time intervals, each of the partial signals being frequency modulated ramps having a same frequency and slope, and the transmit signals differing from one another with regard to the time intervals of the partial signals,
- wherein the differences of the time intervals of the partial signals are defined such that interference by external radar systems is reduced.

14. The radar system according to claim 13, wherein the processor is configured to carry out a method comprising:
- providing the first, the second, and the at least one third transmit signal; and
- transmitting the first, the second and the at least one third transmit signals successively via the transmit antenna of the radar system, each of the first, the second and the at least one third transmit signals being transmitted with partial signals that are transmitted at the time intervals and each of the partial signals being frequency modulated ramps having the same frequency and slope,
- wherein the first, the second and the at least one third transmit signals differ from one another with regard to the time intervals of the partial signals, and
- wherein the differences of the time intervals of the partial signals are defined such that interference by external radar systems is reduced.

\* \* \* \* \*